US012594710B2

(12) United States Patent
Yokomizo et al.

(10) Patent No.: US 12,594,710 B2
(45) Date of Patent: Apr. 7, 2026

(54) HEAT BOLT UNIT, DIE LIP ADJUSTING DEVICE, EXTRUSION MOLDING DIE, EXTRUSION MOLDING DEVICE, AND METHOD FOR MANUFACTURING HEAT BOLT UNIT

(71) Applicants: THE JAPAN STEEL WORKS, LTD., Tokyo (JP); AX MOLDING CO., LTD., Tokyo (JP)

(72) Inventors: Kazuya Yokomizo, Tokyo (JP); Hideki Tomiyama, Tokyo (JP); Masaki Takahashi, Tokyo (JP); Yuji Suga, Tokyo (JP); Shin-ichiro Yokota, Tokyo (JP)

(73) Assignees: THE JAPAN STEEL WORKS, LTD., Tokyo (JP); AX MOLDING CO., LTD., Tokyo (JP)

( * ) Notice: Subject to any disclaimer, the term of this patent is extended or adjusted under 35 U.S.C. 154(b) by 152 days.

(21) Appl. No.: 18/276,034

(22) PCT Filed: Feb. 26, 2021

(86) PCT No.: PCT/JP2021/007561
§ 371 (c)(1),
(2) Date: Aug. 6, 2023

(87) PCT Pub. No.: WO2022/180850
PCT Pub. Date: Sep. 1, 2022

(65) Prior Publication Data
US 2024/0157624 A1 May 16, 2024

(51) Int. Cl.
*B29C 48/86* (2019.01)
*B29C 48/08* (2019.01)
*B29C 48/31* (2019.01)

(52) U.S. Cl.
CPC ............ *B29C 48/865* (2019.02); *B29C 48/08* (2019.02); *B29C 48/313* (2019.02)

(58) Field of Classification Search
CPC ....... B29C 48/08; B29C 48/31; B29C 48/313; B29C 48/865; B29C 48/92
See application file for complete search history.

(56) References Cited

U.S. PATENT DOCUMENTS

| | | | | | |
|---|---|---|---|---|---|
| 3,940,221 A | * | 2/1976 | Nissel | ..................... | B29C 48/31 |
| | | | | | 425/141 |
| 5,051,082 A | * | 9/1991 | Hattori | .................. | B29C 48/313 |
| | | | | | 425/141 |

(Continued)

FOREIGN PATENT DOCUMENTS

| | | |
|---|---|---|
| JP | 2002-11775 A | 1/2002 |
| JP | 2006-021413 A | 1/2006 |

(Continued)

OTHER PUBLICATIONS

Extended European Search Report and European Search Opinion issued Dec. 20, 2024, in European Patent Application No. 21927949.4.

(Continued)

*Primary Examiner* — Yunju Kim
(74) *Attorney, Agent, or Firm* — Potomac Law Group, PLLC

(57) ABSTRACT

A heat bolt unit according to one embodiment includes a plurality of heat bolts disposed in parallel to one another, and a holding portion that holds the plurality of heat bolts. The holding portion holds a base end portion of each of the plurality of heat bolts disposed in parallel to one another. In other words, the holding portion holds the plurality of heat bolts disposed in parallel to one another in a cantilever manner.

17 Claims, 13 Drawing Sheets

(56) References Cited

U.S. PATENT DOCUMENTS 5,626,888  A       5/1997  Sänze et al.
6,019,924  A  *    2/2000  Montalbano ............ B29C 48/08
                                            425/141

FOREIGN PATENT DOCUMENTS

JP        2007-296673  A      11/2007
JP        2013-052574  A       3/2013

OTHER PUBLICATIONS

International Search Report from International Patent Application
No. PCT/JP2021/007561, May 18, 2021.
Office Action issued Jul. 16, 2024, in Japanese Patent Application
No. 2023-502010.
Office Action issued Nov. 29, 2025, in Chinese Patent Application
No. 202180094570.X.

* cited by examiner

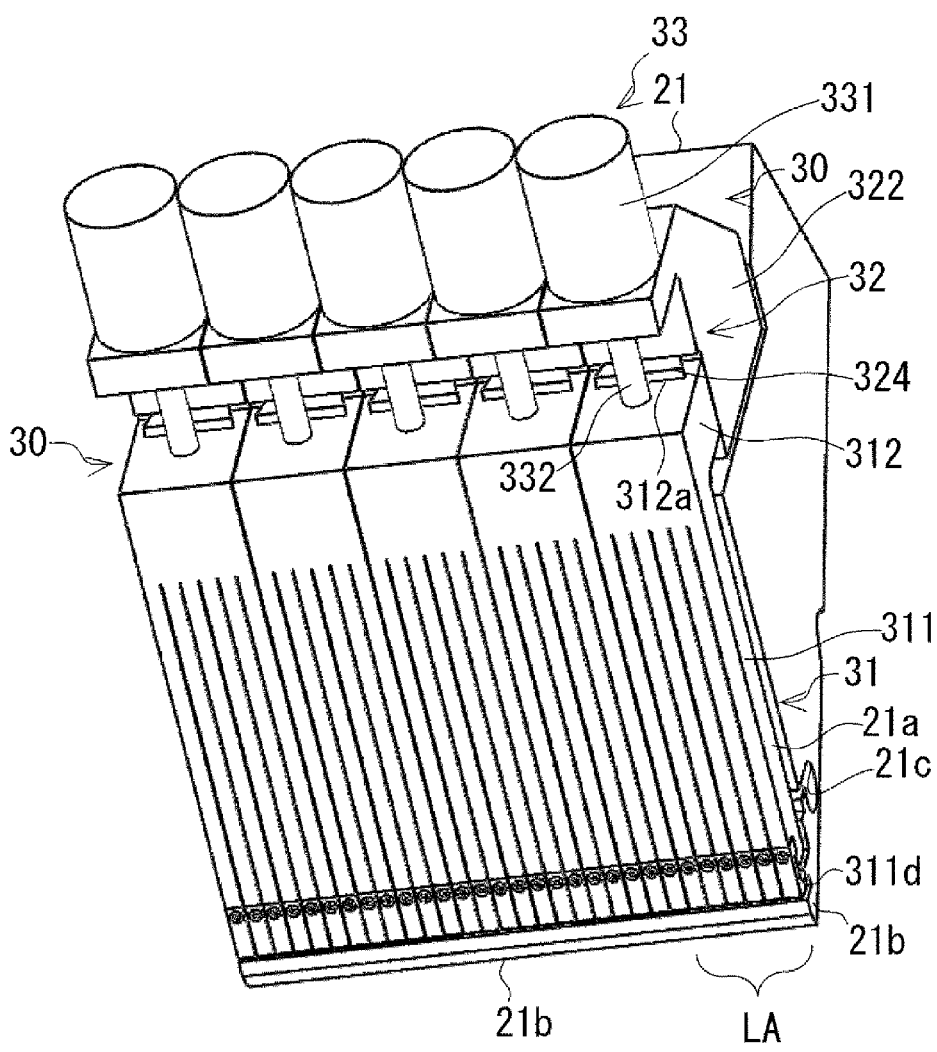
F i g. 3

LIP DISPLACEMENT AMOUNT ANALYSIS RESULT

1

HEAT BOLT UNIT, DIE LIP ADJUSTING DEVICE, EXTRUSION MOLDING DIE, EXTRUSION MOLDING DEVICE, AND METHOD FOR MANUFACTURING HEAT BOLT UNIT

TECHNICAL FIELD

The present invention relates to a heat bolt unit, a die lip adjusting device, an extrusion molding die, an extrusion molding apparatus, and a method for manufacturing the heat bolt unit.

BACKGROUND ART

There is known an extrusion molding die (T die) that extrudes a film-shaped molten resin from a space (a slit, a gap; hereinafter, referred to as a lip gap) between lips formed at a tip end (see Patent Literature 1, for example).

Patent Literature 1 discloses a plurality of heat bolts disposed in a width direction of an extrusion molding die in order to control the thickness of a film-shaped molten resin extruded from a lip gap uniformly throughout an entire region in a width direction thereof. By manually rotating a lip adjusting screw, the heat bolts move in an axial direction thereof to push or pull one lip (a movable lip, a flexible lip), and locally adjust the lip gap. Thereby, the thickness of the film-shaped molten resin that is pushed out of the lip gap thereafter is controlled to be uniform.

CITATION LIST

Patent Literature

Patent Literature 1: Japanese Unexamined Patent Application Publication No. 2013-52574

SUMMARY OF INVENTION

Technical Problem

There is a room for improvement because it takes a considerable amount of time to manually rotate lip adjusting screws of a plurality of heat bolts one by one to adjust the lip gap.

The other problems and new features will become apparent from the description of the present specification and the accompanying drawings.

Solution to Problem

A heat bolt unit according to one embodiment includes a plurality of heat bolts disposed in parallel to one another, and a holding portion holding the plurality of heat bolts. The holding portion holds a base end portion of each of the plurality of heat bolts disposed in parallel to one another. In other words, the holding portion holds the plurality of heat bolts disposed in parallel to one another in a cantilever manner.

Advantageous Effects of Invention

According to the one embodiment, it is possible to provide the heat bolt unit, the die lip adjusting device, the extrusion molding die, the extrusion molding apparatus, and the method for manufacturing the heat bolt unit that can shorten the time period required for adjustment of the lip gap.

BRIEF DESCRIPTION OF DRAWINGS

FIG. 3 is a perspective view of a die block 21 to which the die lip adjusting device 30 is attached;

FIG. 8A is a view showing a way of attaching (inserting) a heater 311b to a heat bolt body 311a;

FIG. 8B is a view showing a state in which the heater 311b is attached to the heat bolt body 311a;

DESCRIPTION OF EMBODIMENTS

Hereinafter, specific embodiments will be described in detail with reference to the drawings. However, the present invention is not limited to the following embodiments. Further, in order to clarify the explanation, the following description and drawings are properly simplified.

Embodiment 1

<Entire Configuration of Extrusion Molding Apparatus>

Figure 1:
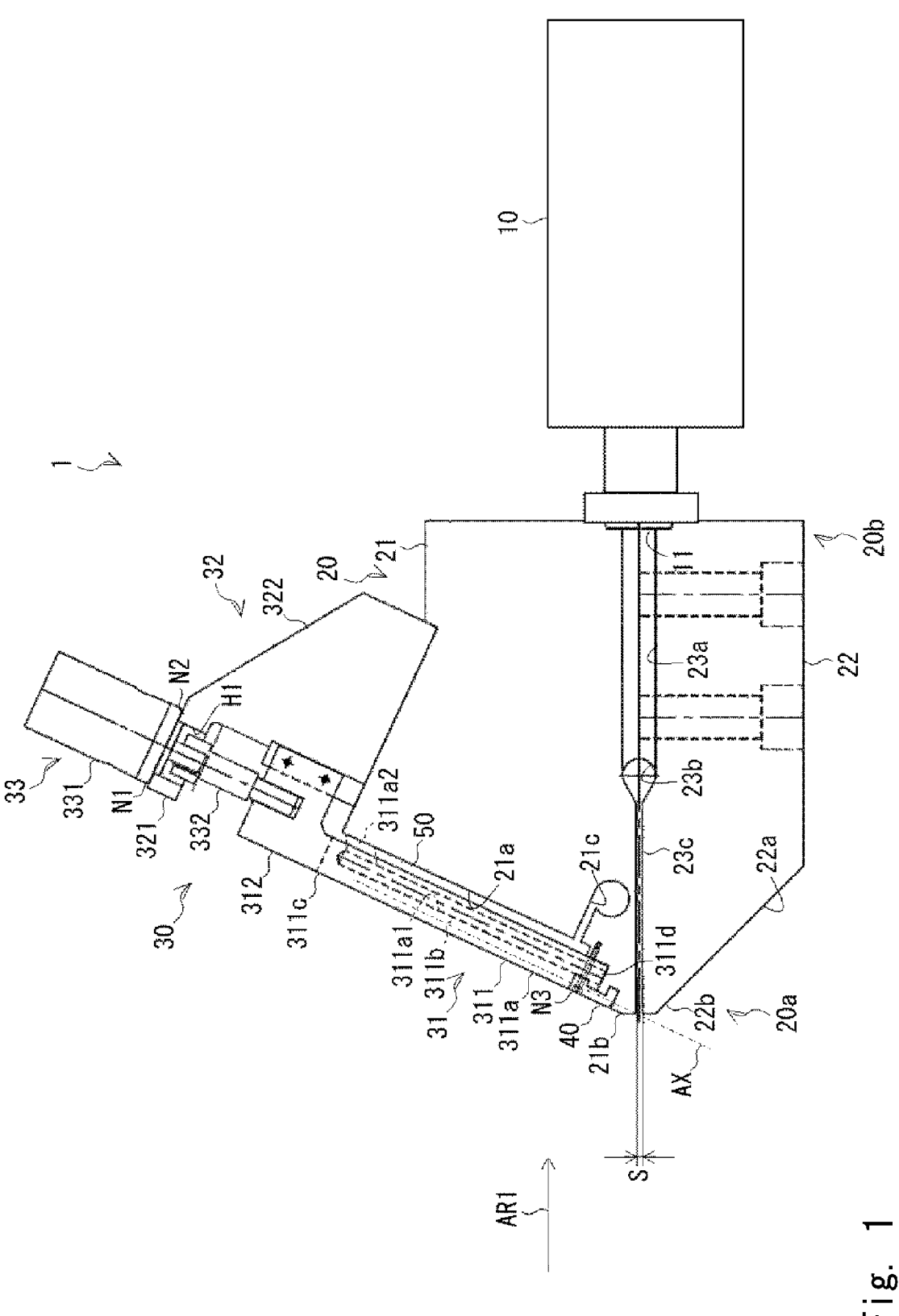
FIG. 1 is a side view showing an entire configuration of an extrusion molding apparatus 1 according to embodiment 1.

First, an entire configuration of an extrusion molding apparatus 1 according to embodiment 1 will be described with reference to FIG. 1. FIG. 1 is a side view showing the entire configuration of the extrusion molding apparatus 1 according to embodiment 1.

The extrusion molding apparatus 1 is an apparatus that extrudes a molten resin that is extruded from an extruder 10 (molten resin outlet 11) into a film form from a slit outlet formed at a tip end of a T die 20 (extrusion molding die), that is, a space (a slit, a gap) between lips. In the present specification, the film includes a sheet.

As shown in FIG. 1, the extrusion molding apparatus 1 includes the extruder 10, the T die 20, and a die lip adjusting device 30.

The extruder 10 is a device that extrudes a resin that is heated and melted (hereinafter, referred to as a molten resin)

from the molten resin outlet 11. The extruder 10 may be a screw type extruder or may be a plunger type extruder.

<Configuration of T Die>

Next, a configuration of the T die 20 will be described with reference to FIG. 1.

The T die 20 is a block-shaped member that molds the molten resin extruded from the extruder 10 into a film form. The T die 20 is typically made of a metal.

As shown in FIG. 1, a base end portion 20*b* side of the T die 20 is attached to the extruder 10 in a state in which a tip end portion 20*a* and a base end portion 20*b* thereof are disposed in a horizontal direction. Note that though not illustrated, the base end portion 20*b* side of the T die 20 may be attached to the extruder 10 in a state in which the tip end portion 20*a* and the base end portion 20*b* thereof are disposed in a vertical direction.

The T die 20 includes a pair of die blocks 21 and 22. The pair of die blocks 21 and 22 respectively include surfaces facing each other. The T die 20 includes an introduction passage 23*a*, a manifold 23*b*, and a slit 23*c* that are formed between the surfaces facing each other.

The introduction passage 23*a* is a passage that allows the base end portion 20*b* of the T die 20 which the extruder 10 faces, and the manifold 23*b* to communicate with each other. The introduction passage 23*a* extends from the base end portion 20*b* of the T die 20 toward the tip end portion 20*a* on an opposite side thereof. A molten resin that is extruded from the extruder 10 is introduced into the introduction passage 23*a*.

The manifold 23*b* is a passage extending in a width direction (direction orthogonal to a paper surface in FIG. 1) of the T die 20. The manifold 23*b* is formed in a middle between the base end portion 20*b* and the tip end portion 20*a* of the T die 20. The molten resin passing through the introduction passage 23*a* is introduced into the manifold 23*b*. The molten resin passing through the introduction passage 23*a* passes through the manifold 23*b* and thereby is pushed and spread in the width direction of the T die 20. The introduction passage 23*a* and the manifold 23*b* configure a T shape. The introduction passage 23*a* corresponds to a vertical bar configuring the T shape, and the manifold 23*b* corresponds to a horizontal bar configuring the T shape.

The slit 23*c* is a gap that allows the tip end portion 20*a* of the T die 20 and the manifold 23*b* to communicate with each other. The slit 23*c* extends in the width direction of the T die 20.

A pair of die blocks 21 and 22 respectively include tip end portions including taper surfaces 21*a* and 22*a* that are inclined toward tip ends. The die block 21 includes a movable lip 21*b* (flexible lip). The movable lip 21*b* can locally displace with a bottom portion of a recessed portion 21*c* formed at the tip end portion of the die block 21 as a support point by being pushed or pulled by a heat bolt 311 described later. A tip end of the tip end portion of the die block 21 is the movable lip 21*b*.

On the other hand, the die block 22 includes a fixed lip 22*b*. The fixed lip 22*b* does not displace even when the movable lip 21*b* is pushed or pulled by the heat bolt 311 described later. A tip end of the tip end portion of the die block 22 is the fixed lip 22*b*. The movable lip 21*b*, the fixed lip 22*b*, and the recessed portion 21*c* extend in the width direction of the T die 20.

In the T die 20 of the above-described configuration, the molten resin extruded from the extruder 10 passes through the introduction passage 23*a* and the manifold 23*b* provided inside of the T die 20, in this order. At this time, the molten resin is pushed and spread in the width direction of the T die

20 by passing through the manifold 23*b*. The molten resin that is pushed and spread in the width direction of the T die 20 passes through the slit 23*c*, and finally is finally extruded into a film form from a slit outlet formed at a tip end of the T die 20, that is, a space S (a slit, a gap; see FIG. 1; hereinafter, referred to as a lip gap S) between the movable lip 21*b* and the fixed lip 22*b*. A width of the molten resin extruded into a film form corresponds to the width of the T die 20.

<Configuration of Die Lip Adjusting Device>

Figure 2:
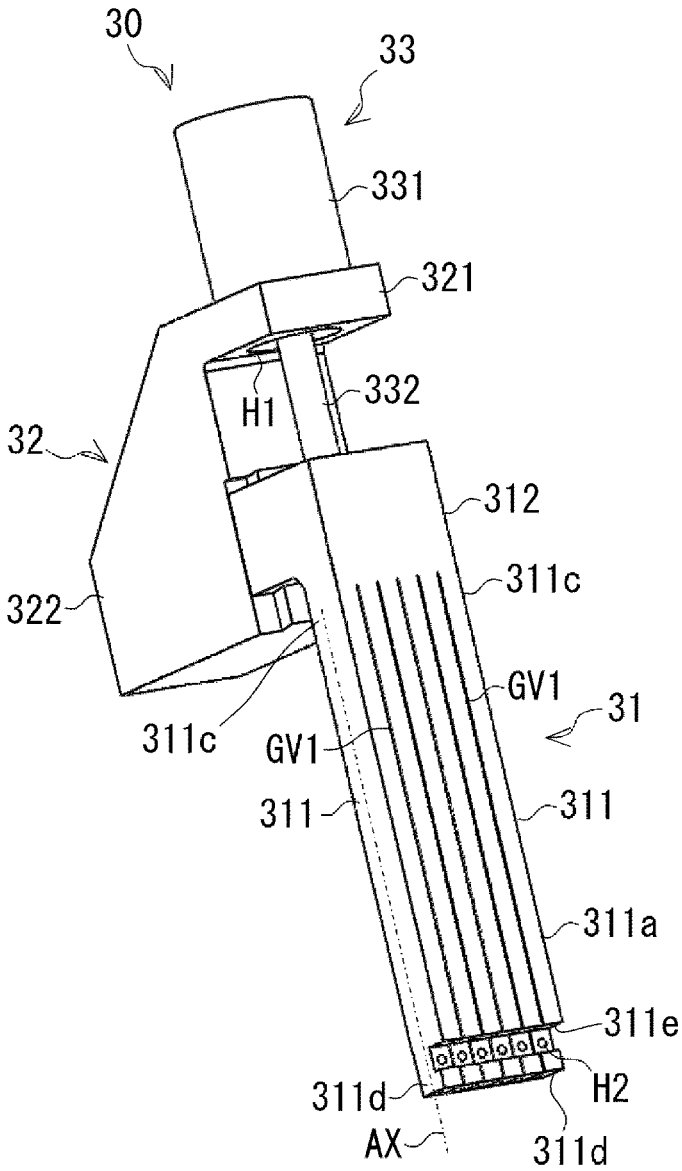
FIG. 2 is a perspective view of a die lip adjusting device 30 illustrated in FIG. 1.

Embodiment 1 is characterized by including a die lip adjusting device 30 that will be described below. FIG. 2 is a perspective view of the die lip adjusting device 30 illustrated in FIG. 1.

As shown in FIG. 2, the die lip adjusting device 30 includes a heat bolt unit 31 in which a plurality of heat bolts 311 are unitized into one unit, and an actuator 33 that moves the heat bolt unit 31. The actuator 33 moves the heat bolt unit 31, whereby the plurality of heat bolts 311 simultaneously move, and respective tip end portions 311*d* of the plurality of heat bolts 311 simultaneously push or pull the movable lip 21*b*. Thereby, the lip gap S is adjusted in a unit of the plurality of heat bolts 311.

Hereinafter, a configuration of the die lip adjusting device 30 will be described in detail.

As shown in FIG. 2, the die lip adjusting device 30 includes the heat bolt unit 31, a guide unit 32, and the actuator 33.

The heat bolt unit 31 is a member in which the plurality of heat bolts 311 are unitized into one unit. The heat bolt unit 31 includes the plurality of heat bolts 311, and a holding portion 312.

The heat bolt 311 includes a heat bolt body 311*a*, and a heater 311*b* (see FIG. 1).

The heat bolt body 311*a* is a rod-shaped member. The heat bolt body 311*a* is typically made of a metal. For example, the heat bolt body 311*a* is made of a steel (for example, made of SCM440 (chromium molybdenum steel)) with relatively high hardness. A shape of the heat bolt body 311*a* is a quadrangular prism shape. The heat bolt body 311*a* may be made of a material other than a metal, as long as the heat bolt body 311*a* can thermally expand or contract in an axial direction (a lengthwise direction of the heat bolt body 311*a* that is a rod-shaped member; see a direction in which an alternate long and short dash line denoted by reference sign AX in FIG. 1 and FIG. 2). Further, the shape of the heat bolt body 311*a* may be, for example, a polygonal prim shape or a cylindrical shape other than a quadrangular prism shape.

The heater 311*b* is a temperature control unit that controls a temperature of the heat bolt body 311*a*. For example, the heater 311*b* is a cartridge heater.

The heat bolt body 311*a* has a bottomed heater insertion hole 311*a*1 (see dotted line in FIG. 1) that opens on a tip end portion side (lower side in FIG. 1) and extends from the tip end portion side toward a base end portion side (upper side in FIG. 1). A diameter of the heater insertion hole 311*a*1 is slightly larger than a diameter of the heater 311*b* (larger by approximately 0.1 mm, for example).

Further, the heat bolt body 311*a* has a through-hole 311*a*2 (hereinafter, referred to as the through-hole 311*a*2 for control line) that allows the heater insertion hole 311*a*1 and an outside of the heater insertion hole 311*a*1 to communicate with each other (see FIG. 1). The through-hole 311*a*2 for control line allows, for example, a bottom portion side (upper side in FIG. 1) of the heater insertion hole 311*a*1, and the outside of the heater insertion hole 311*a*1 (for example, an outer peripheral surface on a side which the taper surface 21*a* of the die block 21 faces, in the heat bolt body 311*a*) to communicate with each other.

The heater 311*b* is attached to the heat bolt body 311*a* in a state in which the heater 311*b* is inserted into the heater insertion hole 311*a*1. Specifically, the heater 311*b* is attached to the heat bolt body 311*a* as follows.

Figure 8A:
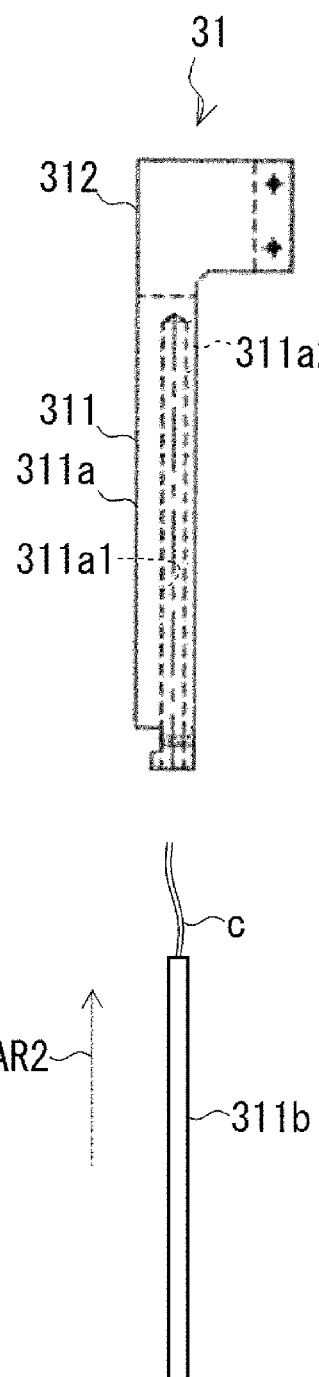
Figure 8B:
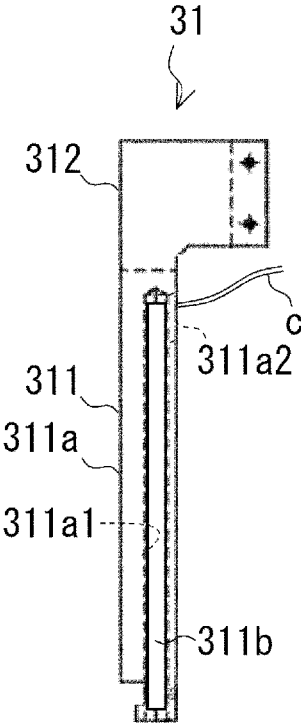

FIG. 8A is a view showing a way of attaching (inserting) the heater 311*b* to the heat bolt body 311*a*, and FIG. 8B is a view showing a state in which the heater 311*b* is attached to the heat bolt body 311*a*.

As shown in FIG. 8A, the heater 311*b* is firstly inserted into the heater insertion hole 311*a*1 from a side where a control line c for controlling the heater 311*b* is electrically connected (see an arrow denoted by reference sign AR2 in FIG. 8A). As shown in FIG. 8B, the heater 311*b* is disposed in the heater insertion hole 311*a*1 in a state in which an outer peripheral surface (entire periphery) is surrounded by an inner wall (inner peripheral surface) of the heater insertion hole 311*a*1. At this time, the control line c is led outside of the heater insertion hole 311*a*1 via the through-hole 311*a*2 for control line. The control line c is not led out to a front surface side, but to a die block 21 side (right side in FIG. 8B). Thereby, when viewed from a front surface direction (see an arrow AR1 in FIG. 1), the control line c is prevented from being visually recognized, and a clean look is realized.

Figure 5:
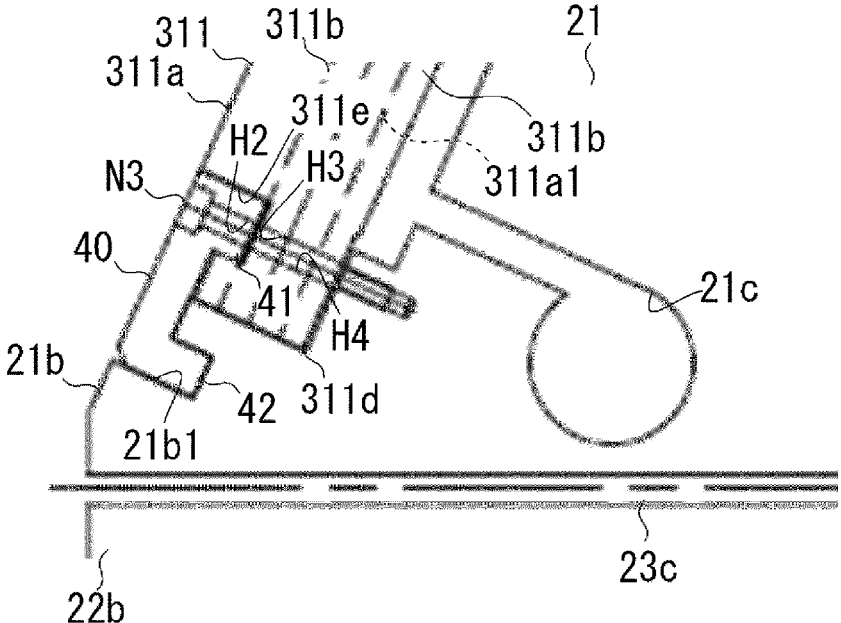
FIG. 5 is a partially enlarged view of a vicinity of a tip end portion 311d of a heat bolt 311 and a movable lip 21b in FIG. 1.

Next, as shown in FIG. 5, a screw N3 that is inserted into through-holes H2 and H3 that allow one protruded portion 41 of a coupling member 40 and the tip end portion 311*d* of the heat bolt 311 to communicate with each other, and a through-hole H4 formed in the heater 311*b* is screwed into the movable lip 21*b* (die block 31). Thereby, the heater 311*b* is prevented from slipping out of the heater insertion hole 311*a*1.

As above, the heater 311*b* is attached to the heat bolt body 311*a*. Since the heater 311*b* is attached in the state in which the outer peripheral surface (entire periphery) of the heater 311*b* is surrounded by the inner wall (inner peripheral surface) of the heater insertion hole 311*a*1 at this time, heat conduction efficiency is improved. A heat conducting member (not illustrated) is desirably disposed between the outer peripheral surface (entire periphery) of the heater 311*b* and the inner wall of the heater insertion hole 311*a*1. Thereby, the heat conduction efficiency is further improved. The heat conducting member is, for example, heat conducting grease, and a heat conducting sheet.

A control unit (not illustrated) is electrically connected to the heater 311*b*. The control unit controls a heating temperature of the heater 311*b*. The heat bolt body 311*a* thermally expands or contracts in the axial direction thereof in response to the heating temperature.

The plurality of heat bolts 311 are disposed in parallel to one another.

The holding portion 312 is a member that holds the plurality of heat bolts 311 disposed in parallel. Specifically, the holding portion 312 holds the base end portion 311*c* of each of the plurality of heat bolts 311 disposed in parallel. In other words, the holding portion 312 holds the plurality of heat bolts 311 in a cantilever manner. Thereby, when the respective heat bolts 311 thermally expand or contract in the axial direction thereof, the tip end portions 311*d* (free end portions) of the respective heat bolts 311 can move in the axial direction thereof with respect to the holding portion 312. The tip end portions 311*d* of the respective heat bolts 311 that move push and pull the movable lip 21*b* as described later.

The holding portion 312 is typically made of a metal. Note that the holding portion 312 may be made of a material other than a metal as long as the holding portion 312 can hold the plurality of heat bolts 311 disposed in parallel. Further, a shape of the holding portion 312 may be any shape.

The plurality of heat bolts 311 and the holding portion 312 may be an integral object or may be an assembled body in which the plurality of heat bolts 311 and the holding portion 312 that are separate from one another are combined. Note that in FIG. 2, six heat bolts 311 are illustrated, but the number of heat bolts 311 is not limited to six, as long as the number of heat bolts 311 is plural.

<Method for Manufacturing Heat Bolt Unit>

Next, a method for manufacturing the heat bolt unit 31 will be described.

Figure 9:
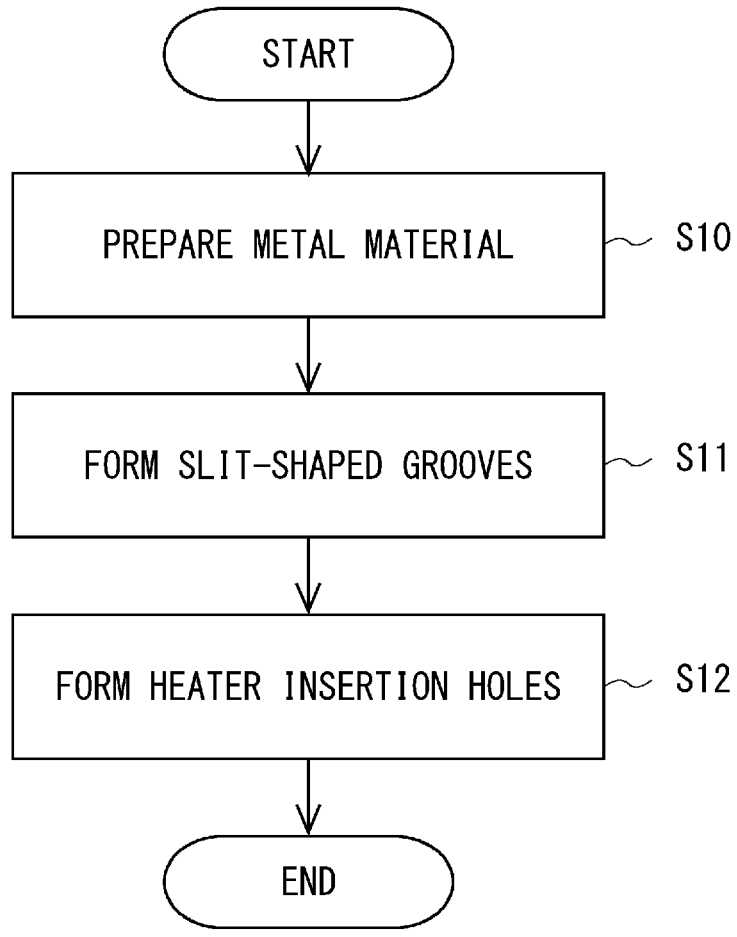
FIG. 9 is a flowchart of a method for manufacturing a heat bolt unit 31.

FIG. 9 is a flowchart of the method for manufacturing the heat bolt unit 31.

As shown in FIG. 9, a metal material including the holding portion 312 and a part to be divided is prepared first (step S10). The part to be divided refers to a part (not illustrated) before divided into the plurality of heat bolt bodies 311*a*, of the heat bolt unit 31.

Next, a plurality of slit-shaped grooves GV1 (see FIG. 2) parallel to one another are formed in the part to be divided (step S11). Thereby, a plurality of heat bolt bodies 311*a* are formed. The slit-shaped groove GV1 can be formed by a rotary blade, or wire cut, for example. Note that the slit-shaped groove GV1 extends from a tip end portion side to a base end portion side of the heat bolt body 311*a*.

Next, the heater insertion holes 311*a*1 are formed in the heat bolt bodies 311*a* (step S12). The heater insertion hole 311*a*1 can be formed by a drill, for example.

As above, the heat bolt unit 31 can be manufactured.

Next, another method for manufacturing the heat bolt unit 31 will be described.

Figure 10:
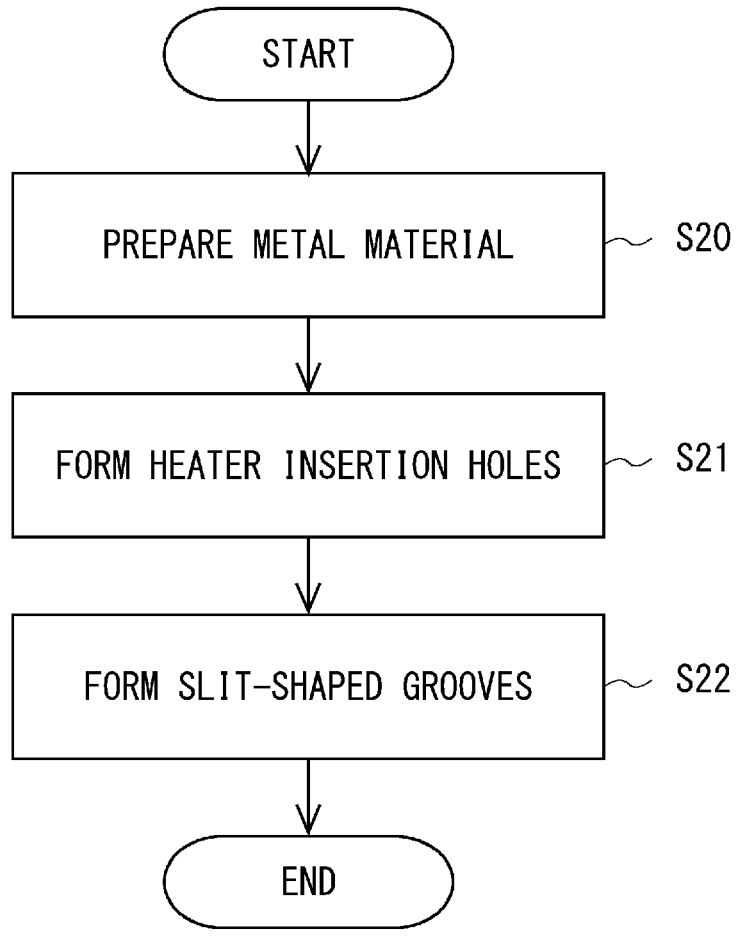
FIG. 10 is a flowchart of another method for manufacturing the heat bolt unit 31.

FIG. 10 is a flowchart of the other method for manufacturing the heat bolt unit 31.

As shown in FIG. 10, a metal material including the holding portion 312 and the part to be divided is prepared (step S20). Next, before formation of the slit-shaped groove GV1 (see FIG. 2), the heater insertion holes 311*a*1 are formed in portions corresponding to the heat bolt bodies 311*a*, of the part to be divided (step S21). Next, a plurality of slit-shaped grooves GV1 (see FIG. 2) parallel to one another are formed in the part to be divided (step S22).

The heat bolt unit 31 may be manufactured as above. In this way, the heater insertion holes 311*a*1 can be formed correctly and easily as compared with the case of forming the heater insertion holes 311*a*1 after formation of the slit-shaped grooves GV1 (see FIG. 9).

The heat bolt unit 31 is slidably attached to the guide unit 32 in the axial direction of the heat bolt 311. Specifically, the heat bolt unit 31 is attached as follows.

Figure 4:
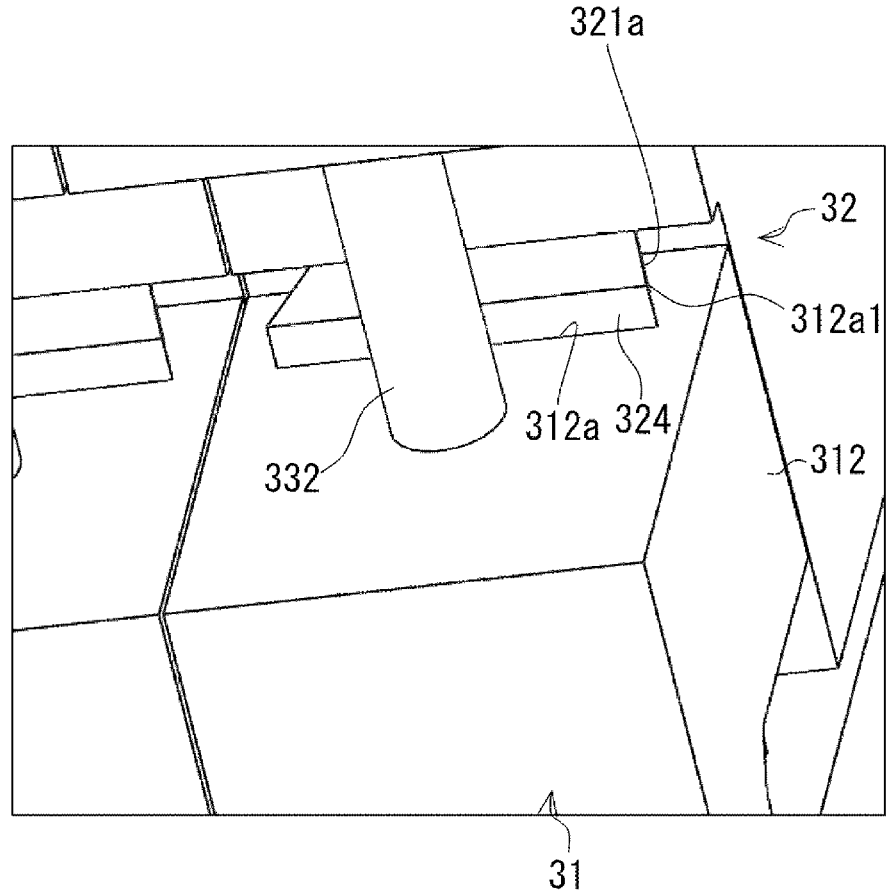
FIG. 4 is a partially enlarged view of a vicinity of a guide protruded portion 324 and a guide groove 312a in FIG. 3.

FIG. 3 is a perspective view of the die block 21 to which the die lip adjusting device 30 is attached. For convenience of explanation, the die block 22 is not illustrated in FIG. 3. FIG. 4 is a partially enlarged view of a vicinity of the guide protruded portion 324 and the guide groove 312*a* in FIG. 3.

As shown in FIG. 3, the guide unit 32 is provided with the guide protruded portion 324. On the other hand, the holding portion 312 is provided with the guide groove 312*a* in which the guide protruded portion 324 is inserted. Conversely, the guide unit 32 may be provided with the guide groove 312*a*, and on the other hand, the holding portion 312 may be provided with the guide protruded portion 324.

The guide protruded portion 324 and the guide groove 312*a* respectively extend in the axial direction of the heat bolt 311. As shown in FIG. 4, a cross-sectional shape (cross-sectional shape by a plane orthogonal to an axis of the heat bolt 311) of each of the guide protruded portion 324 and the guide groove 312*a* is an inverted trapezoidal shape. A taper surface 321*a* (taper surface in an inverted trapezoidal shape) of the guide protruded portion 324 and a taper surface 312*a*1 (taper surface in an inverted trapezoidal shape) of the guide groove 312*a* abut on each other (generally in surface contact).

The heat bolt unit 31 is attached to the guide unit 32 in a state in which the guide protruded portion 324 is inserted in the guide groove 312*a*, and the taper surface of the guide protruded portion 324 and the taper surface of the guide groove 312*a* abut on each other. The taper surface 321*a* of the guide protruded portion 324 and the taper surface 312*a*1 of the guide groove 312*a* are deviation restraining portions (deviation restraining surfaces) that restrains the heat bolt unit 31 from deviating from the axial direction of the heat bolt 311 (for example, the heat bolt unit 31 floating up from the guide unit 32) when the heat bolt unit 31 slides, by abutting on each other. The deviation restraining portions may be surfaces or the like other than the taper surface 321*a* of the guide protruded portion 324 and the taper surface 312*a*1 of the guide groove 312*a*.

Thereby, when the heat bolt unit 31 slides in the axial direction of the heat bolt 311 along the guide groove 312*a*, the heat bolt unit 31 is restrained from deviating from the axial direction of the heat bolt 311. In other words, the heat bolt unit 31 can slide in the axial direction of the heat bolt 311 along the guide groove 312*a* without deviating from the axial direction of the heat bolt 311.

Note that the guide protruded portion 324 and the guide groove 312*a* may not be provided (when the heat bolt unit 31 can slide in the axial direction of the heat bolt 311 even if the guide protruded portion 324 and the guide groove 312*a* are not provided).

As shown in FIG. 2, an actuator 33 is coupled to the heat bolt unit 31.

The actuator 33 is a driving unit that causes the heat bolt unit 31 to slide in the axial direction of the heat bolt 311. The actuator 33 includes an actuator body 331, and a rod 332.

The actuator body 331 is a linear actuator containing a servo motor (not illustrated), and a mechanism (not illustrated) that converts a rotational force of the servo motor into a propulsive force that extrudes or retracts the rod 332 in an axial direction thereof.

As shown in FIG. 1, the actuator body 331 is fixed to the holding portion 321 provided at the guide unit 32 by screws N1 and N2. The rod 332 is inserted into a through-hole H1 formed in the holding portion 321, and extends in the axial direction of the heat bolt 311.

A tip end portion of the rod 332 is fixed to the holding portion 312 of the heat bolt unit 31 attached to the guide unit 32. For example, the tip end portion of the rod 332 is fixed to the holding portion 312 by the tip end portion being screwed into the holding portion 312.

A control unit (not illustrated) is electrically connected to the actuator 33. The control unit controls a moving direction (an extruding direction or a retracting direction) and a moving amount (an extruding amount or a retracting amount) of the rod 332. Thereby, the actuator 33 extrudes or retracts the rod 332 in the axial direction thereof with respect to the actuator body 331. Thereby, the heat bolt unit 31 to which the rod 332 is fixed slides in the axial direction (an actuator 33 side or a counter-actuator 33 side) of the heat bolt 311 along the guide groove 312*a*.

In order to make a thickness of the film-shaped molten resin that is extruded from the lip gap S uniform throughout an entire region in the width direction of the T die 20, a plurality of die lip adjusting devices 30 are attached to the T die 20 (die block 21) in the width direction thereof as shown in FIG. 3. The die lip adjusting device 30 is attached to the die block 21 by fixing (for example, screw fixing) a fixed portion 322 provided at the guide unit 32 to the die block 21.

At this time, a disposition direction of the plurality of heat bolts 311 coincides with the width direction of the T die 20 (die block 21). Note that in FIG. 3, an example in which five die lip adjusting devices are attached is illustrated, but regardless of this, any number of die lip adjusting devices 30 greater than or equal to 1 may be attached to the T die 20 (die block 21) according to the width of the T die 20 (die block 21).

The tip end portion 311*d* of each of the heat bolts 311 is fixed to the movable lip 21*b* (see FIG. 1). Specifically, the tip end portion 311*d* of each of the heat bolts 311 is fixed to the movable lip 21*b* by the coupling member 40 with a U-shaped cross section that is fixed to the movable lip 21*b*.

A configuration of fixing the tip end portion 311*d* of the heat bolt 311 to the movable lip 21*b* will be described further in detail.

FIG. 5 is a partially enlarged view of a vicinity of the tip end portion 311*d* of the heat bolt 311 and the movable lip 21*b* in FIG. 1.

As shown in FIG. 5, the one protruded portion 41 of the coupling member 40 is inserted into a groove 311*e* formed in the tip end portion 311*d* of the heat bolt 311 first, and the other protruded portion 42 of the coupling member 40 is inserted into a groove 21*b*1 formed in the movable lip 21*b*.

Next, the screw N3 inserted in the through-holes H2 and H3 that allow the one protruded portion 41 of the coupling member 40 and the tip end portion 311*d* of the heat bolt 311 to communicate with each other is screwed into the movable lip 21*b*.

At this time, since a shape of the one protruded portion 41 of the coupling member 40 is a tapered wedge shape, by screwing the screw N3 into the movable lip 21*b*, the one protruded portion 41 of the wedge shape presses the tip end portion 311*d* of the heat bolt 311 to the other protruded portion 42. Thereby, the tip end portion 311*d* (tip end surface) of the heat bolt 311 and the movable lip 21*b* are firmly fixed to each other in a close contact state without gaps between both of them.

Thereby, when the tip end portion 311*d* of the heat bolt 311 pulls the movable lip 21*b* to the counter-movable lip 21*b* side (actuator 33 side) as described later, the movable lip 21*b* can be pulled to the counter-movable lip 21*b* side without occurrence of backlash.

When the die lip adjusting device 30 is attached to the T die 20 as above, the respective heat bolts 311 (heaters 311*b*) are disposed near the taper surface 21*a* along (facing) the taper surface 21*a* of the die block 21 as shown in FIG. 1. Thus, in order to inhibit heat of the respective heat bolts 311 (heaters 311*b*) from being transferred to the die block 21, a heat insulator 50 is attached to the taper surface 21*a* of the die block 21.

<Operation Example of Die Lip Adjusting Device>

Next, an operation example of the die lip adjusting device 30 of the above-described configuration will be described.

According to the die lip adjusting device 30 of the above-described configuration, by controlling the moving direction (the extruding direction or the retracting direction) and the moving amount (the extruding amount or the retracting amount) of the rod 332, the lip gap S can be locally adjusted (roughly adjusted) in the unit of the plurality of heat bolts 311.

Specifically, by extruding the rod 332 in the extruding direction by a predetermined amount by the actuator 33, the heat bolt unit 31 coupled to the rod 332 slides to the movable lip 21b side along the guide groove 312a provided in the guide unit 32. At this time, since the taper surface 321a of the guide protruded portion 324 and the taper surface 312a1 of the guide groove 312a abut on each other (see FIG. 4), the heat bolt unit 31 slides to the movable lip 21b side along the guide groove 312a provided in the guide unit 32 without deviating from the axial direction of the heat bolt 311.

Thereby, the respective tip end portions 311d of the plurality of heat bolts 311 provided in the heat bolt unit 31 simultaneously push the movable lip 21b to the fixed lip 22b side. Thereby, the movable lip 21b locally displaces with the bottom portion of the recessed portion 21c as the support point to move close to the fixed lip 22b. Thereby, the lip gap S is locally narrowed. As a result, the thickness of the film-shaped molten resin that is thereafter extruded from the lip gap S locally decreases.

Conversely, by pulling the rod 332 in the retracting direction by a predetermined amount by the actuator 33, the heat bolt unit 31 coupled to the rod 332 slides to the counter-movable lip 21b side (actuator 33 side) along the guide groove 312a provided in the guide unit 32. At this time, since the taper surface 321a of the guide protruded portion 324 and the taper surface 312a1 of the guide groove 312a abut on each other (see FIG. 4), the heat bolt unit 31 slides to the counter-movable lip 21b side along the guide groove 312a provided in the guide unit 32 without deviating from the axial direction of the heat bolt 311.

Thereby, the respective tip end portions 311d of the plurality of heat bolts 311 provided in the heat bolt unit 31 simultaneously pull the movable lip 21b to the counter-movable lip 21b side. At this time, since the tip end portions 311d (tip end surfaces) of the heat bolts 311 and the movable lip 21b are firmly fixed to each other in the state in close contact without gaps between both of them by the coupling member 40 (see FIG. 5), the heat bolts 311 can pull the movable lip 21b to the counter-movable lip 21b side without occurrence of backlash.

Thereby, the movable lip 21b locally displaces with the bottom portion of the recessed portion 21c of the movable lip 21b as the support point and separates from the fixed lip 22b. Thereby, the lip gap S is locally widened. As a result, the thickness of the film-shaped molten resin that is thereafter extruded from the lip gap S locally increases.

The above adjustment (rough adjustment) may be carried out before the film-shaped molten resin is extruded from the lip gap S, or may be carried out while the film-shaped molten resin is extruded from the lip gap S.

Further, according to the die lip adjusting device 30 of the above-described configuration, by controlling the heating temperature of the heater 311b, the lip gap S can be adjusted locally (finely adjusted) in a unit of the single heat bolt 311.

Specifically, by increasing the heating temperature of the heater 311b, the heat bolt 311 thermally expands and increases in the length in the axial direction thereof. At this time, since the heat bolt 311 is held by the holding portion 312 in a cantilever manner, the tip end portion 311d (free end portion) of the heat bolt 311 moves to the movable lip 21b side with respect to the holding portion 312 to push the movable lip 21b to the fixed lip 22b side.

Thereby, the movable lip 21b locally displaces with the bottom portion of the recessed portion 21c as the support point to move close to the fixed lip 22b. Thereby, the lip gap S is locally narrowed. As a result, the thickness of the film-shaped molten resin that is thereafter extruded from the lip gap S locally decreases.

Conversely, by decreasing the heating temperature of the heater 311b, the heat bolt 311 contracts and the length in the axial direction thereof decreases. At this time, since the heat bolts 311 are held by the holding portion 312 in a cantilever manner, the tip end portions 311d (free end portions) of the heat bolts 311 moves to the counter-movable lip 21b side (actuator 33 side) with respect to the holding portion 312 to pull the movable lip 21b to the counter-movable lip 21b side. At this time, since the tip end portions 311d (tip end surfaces) of the heat bolts 311 and the movable lip 21b are firmly fixed to each other in the state in close contact without gaps between both of them by the coupling member 40 (see FIG. 5), the heat bolts 311 can pull the movable lip 21b to the counter-movable lip 21b side without occurrence of backlash.

Thereby, the movable lip 21b locally displaces with the bottom portion of the recessed portion 21c as the support point to separate from the fixed lip 22b. Thereby, the lip gap S is locally widened. As a result, the thickness of the film-shaped molten resin that is thereafter extruded from the lip gap S locally increases.

The above adjustment (fine adjustment) is typically carried out automatically and continuously while the film-shaped molten resin is extruded from the lip gap S.

<Displacement Amount of Lip>

Next, a displacement amount of the movable lip 21b when the lip gap S is adjusted by the plurality of heat bolts 311, and a displacement amount of the movable lip 21b when the lip gap S is adjusted by the single heat bolt 311 will be described.

Figure 6:
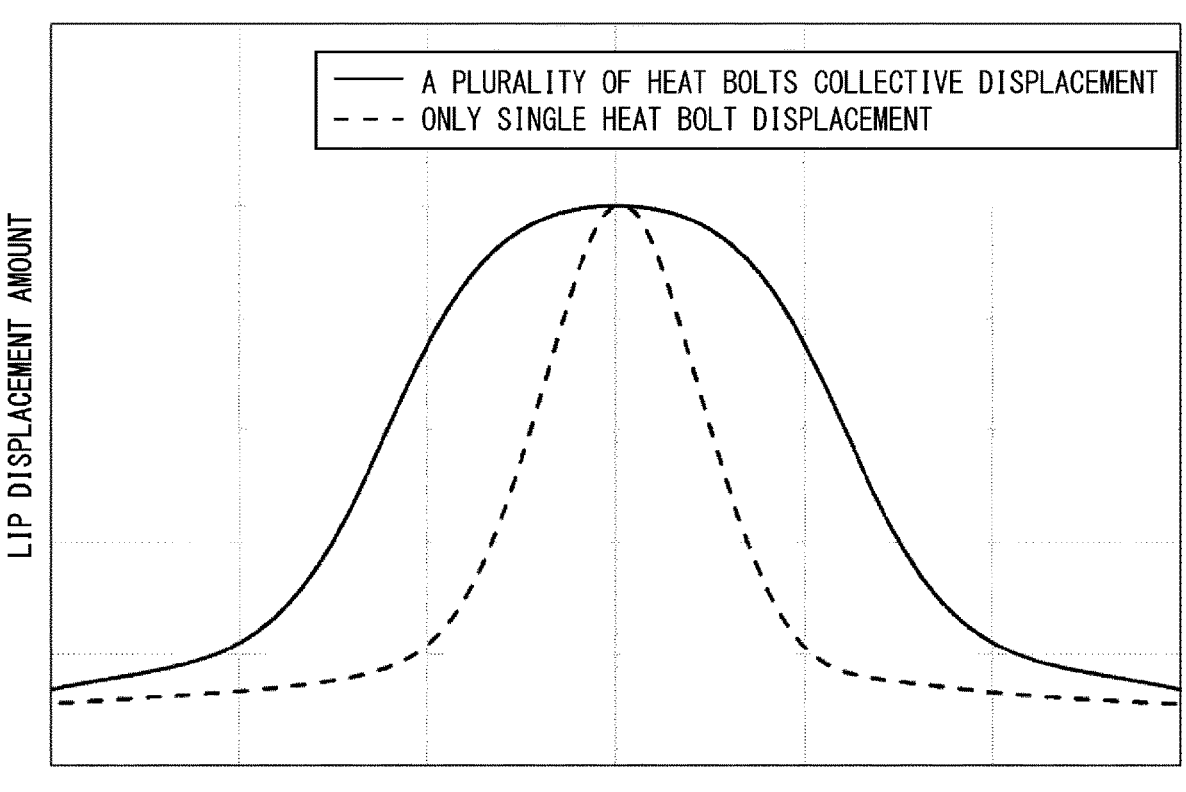
FIG. 6 is a graph showing a displacement amount of the movable lip 21b when a lip gap S is adjusted by a plurality (six) of heat bolts 311, and a displacement amount of the movable lip 21b when the lip gap S is adjusted by the single heat bolt 311.

FIG. 6 is a graph showing the displacement amount of the movable lip 21b when the lip gap S is adjusted by the plurality (six) of heat bolts 311, and a displacement amount of the movable lip 21b when the lip gap S is adjusted by the single heat bolt 311. An axis of abscissas of the graph corresponds to a lip range LA where the tip end portions 311d of the plurality of heat bolts 311 are fixed in FIG. 3.

In FIG. 6, a graph of a solid line shows the displacement amount of the movable lip 21b when the plurality (six) of heat bolts 311 simultaneously adjust the lip gap S by causing the heat bolt unit 31 to slide. On the other hand, a graph of a dotted line shows the displacement amount of the movable lip 21b when the lip gap S is adjusted by thermally expanding the single heat bolt 311 (heat bolt 311 in a third position from a right end in FIG. 3). Note that the graph of the dotted line is drawn so that a center thereof corresponds to a center of the graph of the solid line.

Referring to FIG. 6, it is found that when the lip gap S is adjusted simultaneously by the plurality of heat bolts 311, that is, in the unit of the plurality of heat bolts 311, the lip gap S is adjusted in a wider range and therefore, a time period required for adjustment of the lip gap S can be shortened, as compared with the case in which the lip gap S is adjusted by the single heat bolt 311, that is, in the unit of the single heat bolt 311.

As described above, according to embodiment 1, the die lip adjusting device 30 includes the heat bolt unit 31 in which the plurality of heat bolts 311 are unitized into one unit, and the actuator 33 that moves the heat bolt unit 31, the following effects are exhibited. In other words, the actuator 33 moves the heat bolt unit 31, whereby the plurality of heat bolts 311 simultaneously move, and the respective tip end portions 311*d* of the plurality of heat bolts 311 simultaneously pushes or pulls the movable lip 21*b*.

Thereby, the lip gap S is adjusted in the unit of the plurality of heat bolts 311. Thereby, as compared with the case of adjusting the lip gap S in the unit of the single heat bolt 311, the lip gap S is adjusted in the wider range, so that the time period required for adjustment of the lip gap S can be shortened.

Embodiment 2

Next, embodiment 2 will be described in detail with reference to the drawings.

Embodiment 2 is characterized by including a die lip adjusting device 30A including a lip adjusting screw 34 (lip adjusting bolt) that will be described below, in place of the actuator 33.

Figure 7:
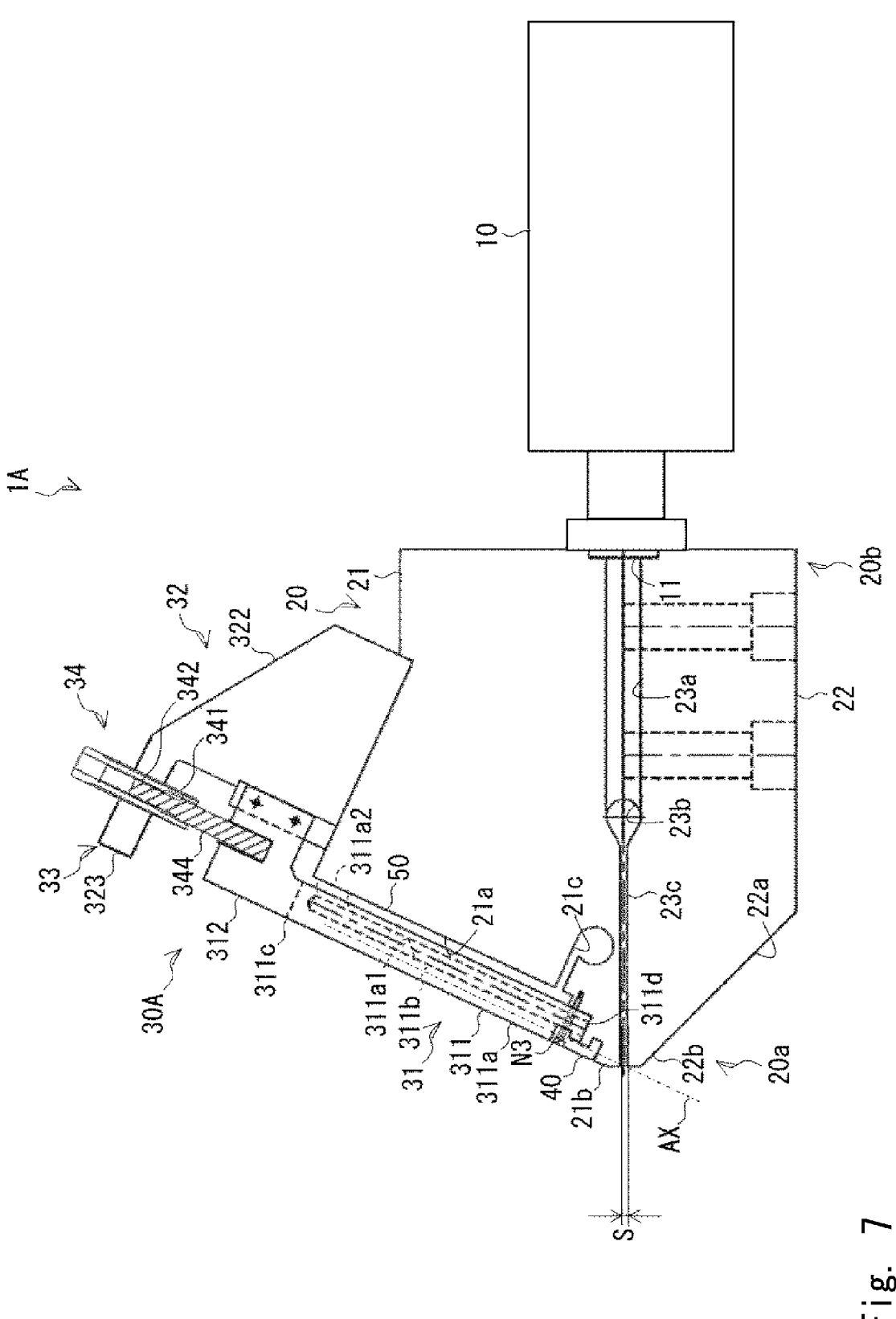
FIG. 7 is a side view showing an entire configuration of an extrusion molding apparatus 1A according to embodiment 2.

FIG. 7 is a side view showing an entire configuration of an extrusion molding apparatus 1A according to embodiment 2.

As shown in FIG. 7, the die lip adjusting device 30A includes a heat bolt unit 31 in which a plurality of heat bolts 311 are unitized into one unit, and the lip adjusting screw 34 that moves the heat bolt unit 31. By rotating the lip adjusting screw 34 under manual operation (including a use of a tool), the plurality of heat bolts 311 simultaneously move, and respective tip end portions 311*d* of the plurality of heat bolts 311 simultaneously push or pull the movable lip 21*b*. Thereby, the lip gap S is adjusted in a unit of the plurality of heat bolts 311.

Hereinafter, concerning a configuration of the die lip adjusting device 30A, a difference from embodiment 1 will be mainly described. The same components as those of embodiment 1 are assigned with the same reference signs, and explanation is properly omitted.

As shown in FIG. 7, the die lip adjusting device 30A includes the heat bolt unit 31, a guide unit 32, and the lip adjusting screw 34.

The lip adjusting screw 34 is a driving unit that causes the heat bolt unit 31 to slide in an axial direction of the heat bolt 311. The lip adjusting screw 34 is a differential screw in which a pitch of an external screw 341 and a pitch of an internal screw 342 are different from each other (the pitch of the external screw 341>the pitch of the internal screw 342).

The external screw 341 of the lip adjusting screw 34 is screwed onto a holding portion 323 provided at the guide unit 32. A rod 344 is screwed onto the internal screw 342 of the lip adjusting screw 34. The rod 344 extends in the axial direction of the heat bolt 311. A tip end portion of the rod 344 is fixed to a holding portion 312 of the heat bolt unit 31 attached to the guide unit 32. For example, the tip end portion of the rod 344 is fixed to the holding portion 312 by the tip end portion of the rod 344 being screwed into the holding portion 312.

<Operation Example of Die Lip Adjusting Device>

Next, an operation example of the die lip adjusting device 30A of the above-described configuration will be described.

According to the die lip adjusting device 30A of the above-described configuration, by rotating the lip adjusting screw 34 under manual operation (including the case of using a tool), the rod 344 is finely fed in an axial direction thereof. For example, when the lip adjusting screw 34 is rotated once, the rod 344 is finely fed in the axial direction thereof by a difference between the pitch of the external screw 341 and the pitch of the internal screw 342.

Thereby, the heat bolt unit 31 to which the rod 344 is fixed slides in the axial direction of the heat bolt 311 (a lip adjusting screw 34 side or a counter-lip adjusting screw 34 side) along a guide groove 312*a*. Thereby, the lip gap S (space between the movable lip 21*b* and a fixed lip 22) can locally be adjusted (roughly adjusted) in the unit of the plurality of heat bolts 311. Since a specific adjustment operation is similar to the operation described in embodiment 1 described above, explanation will be omitted.

Further, according to the die lip adjusting device 30A of the above-described configuration, it is possible to locally adjust (finely adjust) the lip gap S in the unit of the single heat bolt 311 by controlling a heating temperature of a heater 311*b*. Since a specific adjustment operation is similar to the operation described in embodiment 1 described above, explanation will be omitted.

As described above, according to embodiment 2, the die lip adjusting device 30A includes the heat bolt unit 31 in which the plurality of heat bolts 311 are unitized into one unit, and the lip adjusting screw 34 that moves the heat bolt unit 31, and therefore has the following effect. In other words, by rotating the lip adjusting screw 34 under manual operation (including the case of using a tool), the plurality of heat bolts 311 simultaneously move, and the respective tip end portions 311*d* of the plurality of heat bolts 311 simultaneously push or pull the movable lip 21*b*. Thereby, the lip gap S is adjusted in the unit of the plurality of heat bolts 311. Thereby, as compared with the case of adjusting the lip gap S in the unit of the single heat bolt 311, the lip gap S is adjusted in a wider range, so that a time period required for adjustment of the lip gap S can be shortened.

Embodiment 3

Next, embodiment 3 will be described in detail with reference to the drawings.

Embodiment 3 is characterized in that the actuator 33 is an actuator 33B having a rotary shaft described below.

Figure 11:
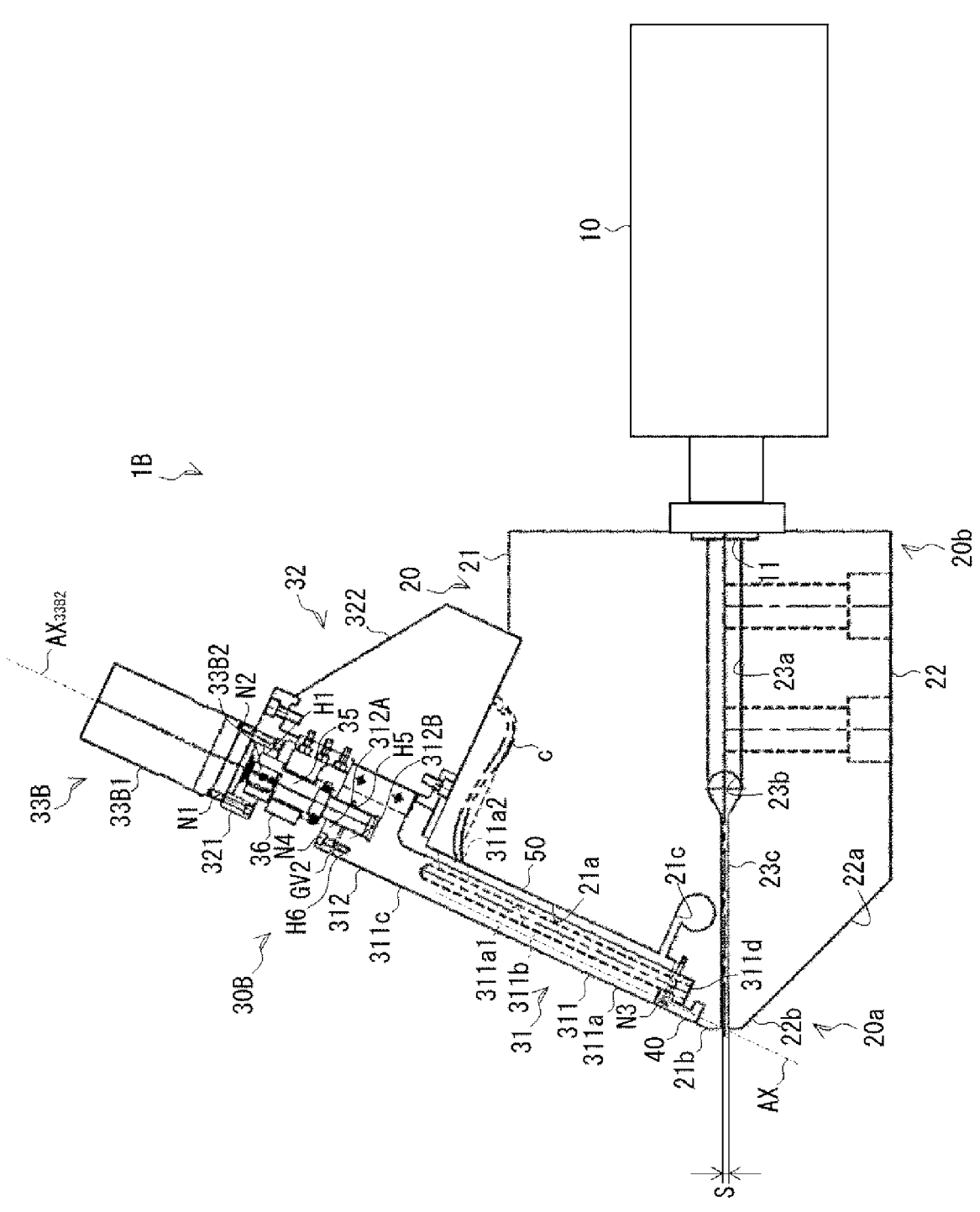
FIG. 11 is a side view showing an entire configuration of an extrusion molding apparatus 1B according to embodiment 3.

FIG. 11 is a side view showing an entire configuration of an extrusion molding apparatus 1B according to embodiment 3.

Hereinafter, concerning a configuration of the die lip adjusting device 30B, a difference from embodiment 1 will be mainly described. The same components as those of embodiment 1 will be assigned with the same reference signs, and explanation will be properly omitted.

As shown in FIG. 11, the die lip adjusting device 30B includes a heat bolt unit 31, a guide unit 32, an actuator 33B, a shaft 35, and a bearing 36.

The actuator 33B includes an actuator body 33B1, and a rotary shaft 33B2 that is rotated by a servomotor (not illustrated) contained in the actuator body 33B1.

As shown in FIG. 11, the actuator body 33B1 is fixed to a holding portion 321 provided at the guide unit 32 by screws N1 and N2. The rotary shaft 33B2 is inserted into a through-hole H1 formed in the holding portion 321 and extends in the axial direction of a heat bolt 311.

In the shaft 35, a base end portion is coupled (fixed) to the rotary shaft 33B2 of the actuator 33B, and a tip end portion is screwed into the holding portion 312 of the heat bolt unit 31 attached to the guide unit 32. The shaft 35 is rotatably supported by the bearing 36 fixed to a fixed portion 322 provided at the guide unit 32. The shaft rotates around a same axis $AX_{33B2}$ by the rotary shaft 33B2 of the actuator 33B rotating (forward rotation or reverse rotation). Thereby, an amount of screwing of a tip end portion of the shaft 35 to the heat bolt unit 31 (holding portion 312) changes. As a result, the heat bolt unit 31 into which the tip end portion of the shaft 35 is screwed slides in an axial direction of the heat bolt 311 (an actuator 33B side or a counter-actuator 33B4 side) along a guide groove 312a.

Next, a configuration for inhibiting a backlash from occurring when the heat bolt unit 31 slides as described above will be described.

The holding portion 312 of the heat bolt unit 31 includes a first portion 312A and a second portion 312B that face each other with a slit-shaped groove GV2 formed in the holding portion 312 therebetween.

The holding portion 312 of the heat bolt unit 31 has a first screw hole H5 and a second screw hole H6 that allow the first portion 312A and the second portion 312B to communicate with each other.

A tip end portion of the shaft 35 is screwed into the first screw hole H5. A groove width adjusting screw N4 for adjusting a groove width of the groove GV2 is screwed into the second screw hole H6. By tightening the groove width adjusting screw N4, the heat bolt unit 31 can slide without occurrence of backlash. A degree to which the groove width adjusting screw N4 is tightened is such that backlash does not occur, for example, 1 Nm or less.

Note that an operation example of the die lip adjusting device 30B of the above-described configuration is similar to that of the die lip adjusting device 30 of embodiment 1, and therefore explanation is omitted.

<Modified Example>

Next, a modified example will be described.

Figure 12:
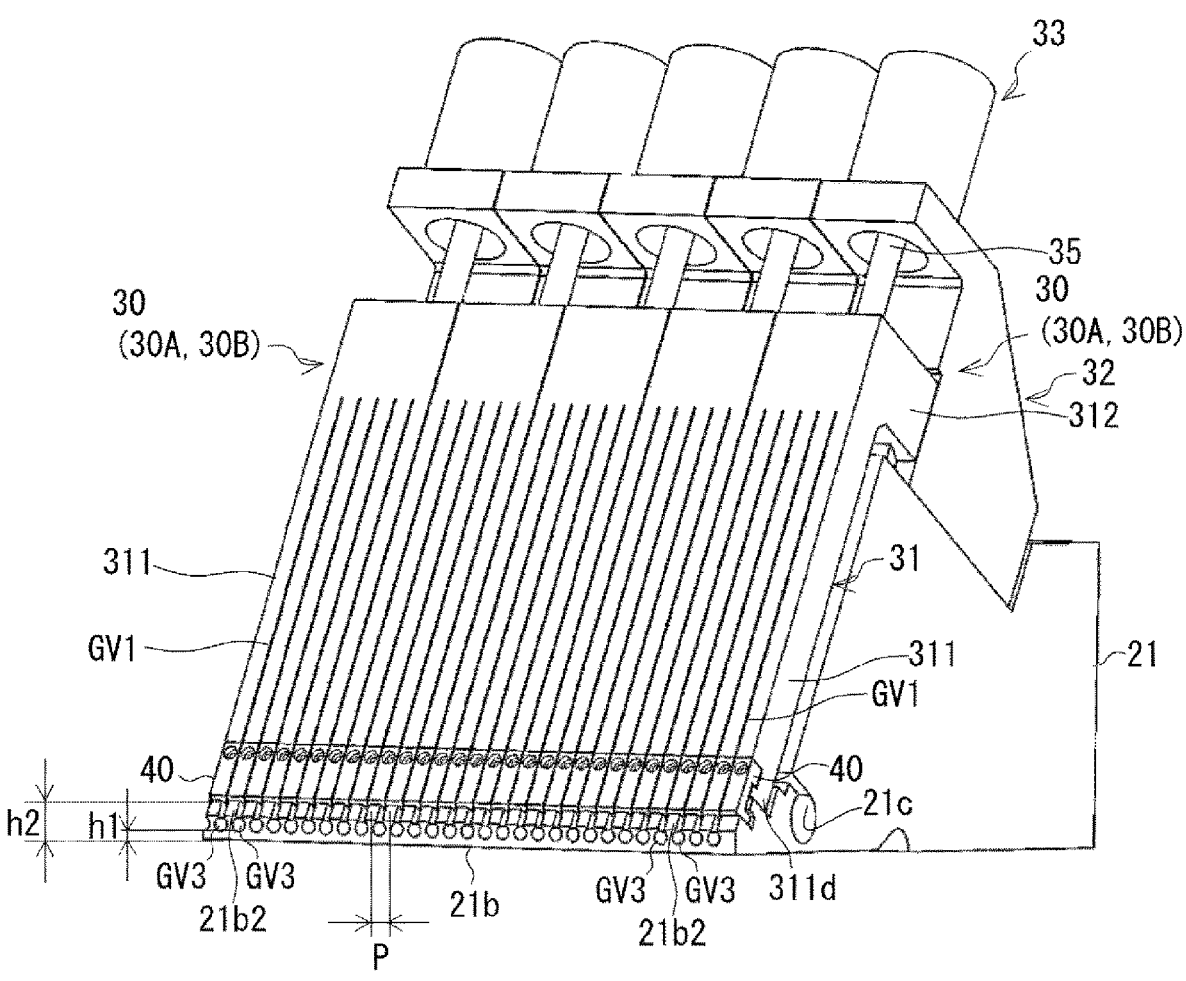
FIG. 12 is a modified example of a T die 20 (die block 21).

FIG. 12 is a modified example of the T die 20 (die block 21).

As shown in FIG. 12, the movable lip 21b of the T die 20 (die block 21) of each of the above-described embodiments includes heat bolt fixing portions 21b2 (plural) to which the tip end portions 311d of the heat bolts 311 are fixed, and a groove GV3 may be formed between the heat bolt fixing portions 21b2 adjacent to each other in the movable lip 21b.

In this way, a thickness h1 between the heat bolt fixing portions 21b2 adjacent to each other in the movable lip 21b can be made thinner than a thickness h2 of the heat bolt fixing portion 21b2. Thereby, even if a pitch P between the heat bolts 311 (and between the heat bolt fixing portions 21b2) is narrowed, the movable lip 21b can be locally displaced in a unit of the single heat bolt 311. As a result, the lip gap S can be locally adjusted (finely adjusted) in the unit of the single heat bolt 311.

Further, in each of the above-described embodiments, the example is described, in which the heater 311b is inserted into the heater insertion hole 311a1 and is attached to the heat bolt body 311a in the state in which the outer peripheral surface (entire periphery) is surrounded by the inner wall (inner peripheral surface) of the heater insertion hole 311a1, but the present invention is not limited to this.

For example, the heater 311b may be attached to the heat bolt body 311a in a state in which the heater 311b is inserted into a recessed portion formed on a periphery (outer peripheral surface) of the heat bolt body 311a. Further, the heater 311b may be attached to the heat bolt body 311a in a state in which the heater 311b surrounds the periphery (outer peripheral surface) of the heat bolt body 311a.

Note that though not illustrated, in each of the above-described embodiments, a deformation restraining member for restraining the heat bolts 311 (heat bolt bodies 311a) from deforming may be disposed between the heat bolts 311 adjacent to each other (the slit-shaped groove GV1. See FIG. 2). The deformation restraining member is a plate-shaped member (for example, a plate-shaped member of a metal) having a thickness that is substantially a groove width of the slit-shaped groove GV1, for example. The deformation restraining member is preferably fixed to the heat bolt body 311a by brazing, for example. In this way, it is possible to restrain the heat bolt 311 (heat bolt body 311a) from deforming.

The invention made by the present inventor is specifically described based on the embodiments thus far, but the present invention is not limited to the embodiments that are already described, and various changes can be made within the range without departing from the gist of the invention.

REFERENCE SIGNS LIST 1, 1A Extrusion Molding Apparatus
10 Extruder
11 Molten Resin Outlet
20 T Die
20a Tip End Portion
20b Base End Portion
21 Die Block
21a Taper Surface
21b Movable Lip
21b1 Groove
21c Recessed Portion
22 Die Block
22a Taper Surface
22b Fixed Lip
23a Introduction Passage
23b Manifold
23c Slit
30, 30A Die Lip Adjusting Device
31 Heat Bolt Unit
32 Guide Unit
33 Actuator
34 Lip Adjusting Screw
40 Coupling Member
41, 42 Protruded Portion
50 Heat Insulator
311 Heat Bolt
311a Heat Bolt Body
311a1 Recessed Portion
311b Heater
311c Base End Portion
311d Tip End Portion
311e Groove
312 Holding Portion
312a Guide Groove
312a1 Taper Surface
321 Holding Portion
321a Taper Surface
322 Fixed Portion
323 Holding Portion
324 Guide Protruded Portion
331 Actuator Body
332 Rod
341 External Screw
342 Internal Screw
344 Rod
H1, H2 Through-Hole
LA Lip Range
N1-N3 Screw
S Lip Gap

The invention claimed is:

1. A heat bolt unit, comprising:
   a plurality of heat bolts each including a heat bolt body and a heater that controls a temperature of the heat bolt body; and a holding portion configured to hold the plurality of heat bolts, wherein the plurality of heat bolts are disposed in parallel to one another, and the holding portion holds a base end portion of each of the plurality of heat bolts disposed in parallel to one another, wherein the holding portion and the plurality of heat bolts are integrally formed.

2. The heat bolt unit according to claim 1, wherein the heat bolt body has a heater insertion hole that opens on a tip end portion side and extends from the tip end portion side to a base end portion side, and the heater is attached to the heat bolt body in a state in which the heater is inserted into the heater insertion hole.

3. The heat bolt unit according to claim 2, wherein the heat bolt body has a through-hole for control wire that allows the heater insertion hole and an outside of the heater insertion hole to communicate with each other.

4. The heat bolt unit according to claim 2, wherein a heat conducting member is disposed between the heater inserted into the heater insertion hole and an inner wall of the heater insertion hole.

5. The heat bolt unit according to claim 1, wherein the holding portion includes a first portion and a second portion that face each other with a slit-shaped groove formed in the holding portion therebetween, the holding portion has a first screw hole and a second screw hole that allow the first portion and the second portion to communicate with each other, the first screw hole is a screw hole into which a rotary shaft rotated by an actuator is screwed, and the second screw hole is a screw hole into which a groove width adjusting screw for adjusting a groove width of the groove is screwed.

6. The heat bolt unit according to claim 1, wherein a deformation restraining member for restraining the heat bolt from deforming is disposed between the heat bolts adjacent to each other.

7. The heat bolt unit according to claim 1, wherein the plurality of heat bolts and the holding portion are an integral object of a metal.

8. A die lip adjusting device, comprising:

the heat bolt unit according to claim 1;

a guide unit to which the heat bolt unit is slidably attached in an axial direction of the heat bolt; and a driving unit that causes the heat bolt unit to slide in the axial direction of the heat bolt.

9. The die lip adjusting device according to claim 8, further comprising:

a guide protruded portion; and a guide groove into which the guide protruded portion is inserted, wherein of the guide protruded portion and the guide groove, one is provided in the holding portion, and the other is provided in the guide unit.

10. The die lip adjusting device according to claim 9, wherein the guide protruded portion and the guide groove respectively include deviation restraining portions that restrain the heat bolt unit from deviating from the axial direction of the heat bolt when the heat bolt unit slides by abutting on each other.

11. The die lip adjusting device according to claim 10, wherein a cross-sectional shape of each of the guide protruded portion and the guide groove is an inverted trapezoidal shape, and the deviation restraining portions are a taper surface in the inverted trapezoidal shape of the guide protruded portion and a taper surface in the inverted trapezoidal shape of the guide groove.

12. The die lip adjusting device according to claim 8, wherein the driving unit is an actuator that is coupled to the heat bolt unit and causes the heat bolt unit to slide in axial direction of the heat bolt.

13. The die lip adjusting device according to claim 12, wherein the actuator includes a servomotor.

14. The die lip adjusting device according to claim 8, wherein the driving unit is a lip adjusting screw that is coupled to the heat bolt unit and causes the heat bolt unit to slide in the axial direction of the heat bolt.

15. An extrusion molding die, comprising:

the die lip adjusting device according to claim 8; and a movable lip to which respective tip end portions of the plurality of heat bolts are fixed.

16. The extrusion molding die according to claim 15, wherein the movable lip includes heat bolt fixing portions to which the tip end portions of the heat bolts are fixed, and a groove is formed between the heat bolt fixing portions adjacent to each other, in the movable lip.

17. An extrusion molding apparatus, comprising the extrusion molding die according to claim 15.

* * * * *